US010249883B2

(12) United States Patent
Leming et al.

(10) Patent No.: US 10,249,883 B2
(45) Date of Patent: Apr. 2, 2019

(54) SOFC CATHODE COMPOSITIONS WITH IMPROVED RESISTANCE TO SOFC DEGRADATION

(71) Applicant: BLOOM ENERGY CORPORATION, Sunnyvale, CA (US)

(72) Inventors: Andres Leming, Sunnyvale, CA (US); Emad El Batawi, Sunnyvale, CA (US); Michael Gasda, Mountain View, CA (US); Tad Armstrong, Burlingame, CA (US); James Wilson, San Francisco, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 147 days.

(21) Appl. No.: 14/936,250

(22) Filed: Nov. 9, 2015

(65) Prior Publication Data
US 2016/0133947 A1 May 12, 2016

Related U.S. Application Data

(60) Provisional application No. 62/078,596, filed on Nov. 12, 2014, provisional application No. 62/185,261, filed on Jun. 26, 2015.

(51) Int. Cl.
*H01M 4/90* (2006.01)
*H01M 8/1253* (2016.01)
*H01M 4/92* (2006.01)
*H01M 4/86* (2006.01)
*H01M 8/124* (2016.01)

(52) U.S. Cl.
CPC ....... *H01M 4/9033* (2013.01); *H01M 4/9066* (2013.01); *H01M 4/92* (2013.01); *H01M 8/1253* (2013.01); *H01M 2004/8689* (2013.01); *H01M 2008/1293* (2013.01);
(Continued)

(58) Field of Classification Search
None
See application file for complete search history.

(56) References Cited

U.S. PATENT DOCUMENTS 8,449,702 B2  5/2013  Batawi et al.
8,580,456 B2  11/2013  Armstrong et al.
(Continued)

OTHER PUBLICATIONS

International Preliminary Report on Patentability from the International Searching Authority for International Patent Application No. PCT/US2015/059754, dated May 26, 2017, 12 pages.
(Continued)

*Primary Examiner* — Wyatt P McConnell
(74) *Attorney, Agent, or Firm* — The Marbury Law Group PLLC

(57) ABSTRACT

A solid oxide fuel cell (SOFC) includes a solid oxide electrolyte with a zirconia-based ceramic, an anode electrode, and a cathode electrode that includes a ceria-based ceramic component and an electrically conductive component. Another SOFC includes a solid oxide electrolyte containing a zirconia-based ceramic, an anode electrode, and a cathode electrode that includes an electrically conductive component and an ionically conductive component, in which the ionically conductive component includes a zirconia-based ceramic containing scandia and at least one of ceria, ytterbia and yttria.

10 Claims, 2 Drawing Sheets

(52) U.S. Cl.
 CPC .... *H01M 2300/0077* (2013.01); *Y02E 60/525* (2013.01); *Y02P 70/56* (2015.11)

(56) References Cited

U.S. PATENT DOCUMENTS

| | | |
|---|---|---|
| 8,748,056 B2 | 6/2014 | Batawi et al. |
| 8,940,112 B2 | 1/2015 | Batawi et al. |
| 2006/0110633 A1* | 5/2006 | Ukai .................. H01M 4/8885 429/488 |
| 2008/0096080 A1 | 4/2008 | Batawi et al. |
| 2008/0254336 A1 | 10/2008 | Batawi |
| 2012/0028162 A1 | 2/2012 | Gottmann et al. |
| 2012/0270139 A1 | 10/2012 | Park et al. |
| 2013/0295484 A1 | 11/2013 | Seo et al. |
| 2013/0295548 A1 | 11/2013 | Brazier |
| 2014/0051010 A1 | 2/2014 | Armstrong et al. |
| 2014/0170531 A1 | 6/2014 | Mohanram et al. |
| 2014/0272114 A1 | 9/2014 | Oriakhi et al. |
| 2014/0377478 A1 | 12/2014 | El Batawi et al. |

OTHER PUBLICATIONS

International Search Report and Written Opinion of the International Searching Authority for PCT/US2015/059754, dated Jan. 29, 2016, 16 pages.

* cited by examiner

US 10,249,883 B2

SOFC CATHODE COMPOSITIONS WITH IMPROVED RESISTANCE TO SOFC DEGRADATION

The present invention is generally directed to fuel cell components, and more particularly to cathode electrode materials for use in solid oxide fuel cells.

BACKGROUND

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 650° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide.

The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

SUMMARY

A solid oxide fuel cell (SOFC) according to various embodiments is composed of a solid oxide electrolyte that includes a zirconia-based ceramic, an anode electrode, and a cathode electrode that includes a ceria-based ceramic component and an electrically conductive component. In an embodiment SOFC, the ceria-based ceramic includes at least one of samaria doped ceria (SDC), gadolinia doped ceria (GDC), and yttria doped ceria (YDC), and the solid oxide electrolyte is at least 80 wt % zirconia. In another embodiment SOFC, the electrically conductive component includes an electrically conductive ceramic selected from the group of lanthanum strontium manganite (LSM), lanthanum calcium manganite (LCM), lanthanum strontium cobalt ferrite (LSCF), lanthanum strontium ferrite (LSF), lanthanum strontium manganese ferrite (LSMF) and lanthanum strontium chromite (LSCr), and lanthanum strontium cobaltite (LSCo).

A SOFC according to other embodiments is composed of a solid oxide electrolyte that includes a zirconia-based ceramic, an anode electrode, and a cathode electrode that includes an electrically conductive component and an ionically conductive component. In some embodiments, the ionically conductive component includes a zirconia-based ceramic containing scandia and at least one of ceria, ytterbia and yttria.

In another embodiment SOFC, the cathode electrode contains around 10-90 wt % of each of the ionically conductive component and the electrically conductive component, and the ionically conductive component includes scandia-stabilized zirconia (SSZ), ceria, and at least one of yttria and ytterbia.

DETAILED DESCRIPTION OF THE EMBODIMENTS

Figure 1:
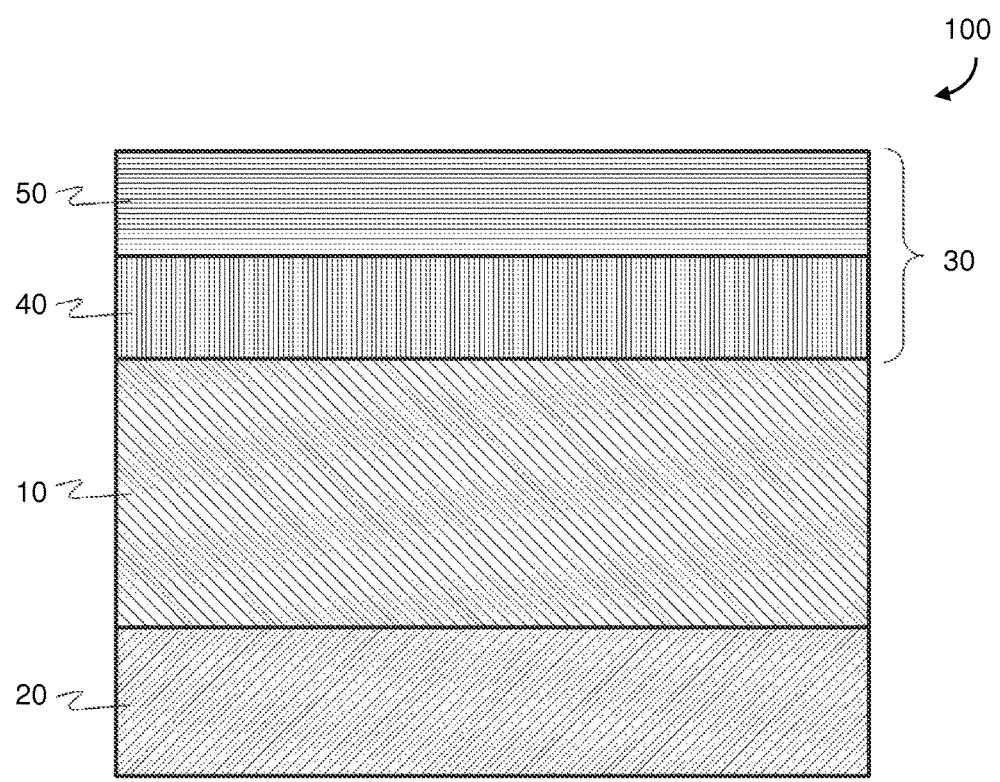
FIG. 1 is a cross-sectional view of a representative solid oxide fuel cell (SOFC) according to an embodiment.

A SOFC 100 generally includes an anode electrode 30, a solid oxide electrolyte 10, and a cathode electrode 20, as shown in FIG. 1. A variety of materials may be used to form the anode electrode. Example anode layer materials may include cermets that are composed of a nickel-containing phase and a ceramic phase.

The electrolyte layer in the SOFC may be composed of an ionically conductive material, such as a zirconia stabilized with scandia. Typically, zirconia is doped with between 8 and 11 mol % scandia ($Sc_2O_3$) in order to stabilize the cubic phase zirconia at high SOFC operating temperature of 800-850° C. In some electrolytes, the scandia stabilized zirconia is co-doped with a one or more secondary rare earth oxide, such as ceria and/or at least one of yttria and ytterbia. One example electrolyte composition is 10Sc1Ce zirconia (10 mol % $Sc_2O_3$-1 mol % $CeO_2$-zirconia). Another example electrolyte composition is 10Sc1Y (10 mol % $Sc_2O_3$-1 mol % $Y_2O_3$-zirconia). Another example electrolyte composition is 10Sc1Ce1Yb (10 mol % $Sc_2O_3$-1 mol % $CeO_2$-1 mol % $Yb_2O_3$-zirconia).

In a SOFC in which the electrolyte layer contains a stabilized zirconia material, the cathode includes an electrically conductive material, such as one or more electrically conductive perovskite (e.g., lanthanum strontium manganite (LSM), lanthanum strontium cobaltite (LSCo), etc.) or metal (e.g., platinum). In some SOFCs, the cathode may be a mixture of the electrically conductive material and an ionically conductive material, such as scandia stabilized zirconia (SSZ).

The present inventors realized that common SOFC materials may undergo voltage degradation based, for example, on changes in electrode microstructures, reactions between materials, changes in internal material structure, and/or poisoning from impurities in fuel or oxidant gases. For example, in composite cathodes, stabilized zirconia (e.g., SSZ) forms resistive phases (i.e., "zirconates") with cobalt- or manganese-based perovskite materials that are typically used as the electrically conductive material. This zirconate formation, which typically occurs early-on during use of the SOFC, causes voltage degradation and therefore reduces performance of the SOFC. Further, the SSZ material experiences continued ageing at the SOFC operating temperatures of 800-850° C. That is, an SSZ-containing cathode may slowly exhibit decreased conductivity over time.

The various embodiments provide improved composite cathode materials for use with zirconia-based electrolyte materials in SOFCs. In particular, embodiment SOFC cathodes may be various mixtures of ionically and electrically conductive components that are selected to avoid short term voltage degradation and long-term decrease in stability in SOFCs with zirconia-based ceramic electrolytes.

In some embodiment cathodes, the ionically conductive component may be a doped ceria-based ceramic, for example, samaria doped ceria (SDC), gadolinia doped ceria (GDC), or yttria doped ceria (YDC). For example, embodiment ceria-based ceramics compositions may have a formula of:

$$Ce_{(1-x)}A_xO_2,$$ (Eq. 1), where A is at least one of Sm, Gd, or Y, x may be greater than 0.1 but less than or equal to 0.4. Preferably, x may be 0.5-0.4, such as x=0.2.

In other embodiment cathodes, the ionically conductive component may be a SSZ-based ceramic composition that also contains one or more additional stabilizing oxide (e.g., ceria, yttria, and/or ytterbia). Such additional oxide(s) may provide sufficient stabilization to the SSZ composition to reduce or prevent the ageing decomposition of the cathode. Without wishing to be bound to a particular theory, it is believed that the stabilizing oxide provides the stabilization of the cubic phase of SSZ, thereby suppressing a cubic to tetragonal phase transformation.

Thus, the various embodiment cathodes may have either a ceria-based ceramic or SSZ-based ceramic as the ionically conductive component. In each of these embodiments, the electrically conductive component may be any of a number of electrically conductive ceramics, such as those with perovskite-based or spinel-based crystal structures. Classes of such electrically conductive ceramics may include, but are not limited to, perovskite manganites (e.g., lanthanum strontium manganite (LSM) and/or lanthanum calcium manganite (LCM)), perovskite ferrites (e.g., lanthanum strontium cobalt ferrite (LSCF), lanthanum strontium ferrite (LSF), and/or lanthanum strontium manganese ferrite (LSMF)), perovskite chromites (e.g., lanthanum strontium chromite (LSCr)), spinel magnesium cobalt oxide ($MgCo_2O_4$), etc. In some embodiments, the electrically conductive component may include, additionally or alternatively, various metals (e.g., platinum).

In some embodiment cathodes, the SSZ-based ceramic composition may contain SSZ and 0-3 mole percent (mol %) total of additional stabilizing oxide, such as both ceria and at least one of yttria and ytterbia.

For example, the SSZ composition may contain 0.5-2.5 mol % total of ceria and at least one of yttria and ytterbia, such as 0.9-2.1 mol % total. of ceria and at least one or yttria and ytterbia. The SSZ composition may contain 0.25-1.25 mol % ceria, such as 0.4-1.1 mol % ceria, and 0.25-1.25 mol % yttria, ytterbia, or a combination of yttria and ytterbia, such as 0.4-1.1 mol % of yttria, ytterbia or a combination of yttria and ytterbia. An example SSZ-based ceramic may be 10Sc1Ce1Y (10 mol % $Sc_2O_3$-1 mol % $CeO_2$-1 mol % $Y_2O_3$-zirconia). Another example SSZ-based ceramic may be 10Sc1Ce1Yb (10 mol % $Sc_2O_3$-1 mol % $CeO_2$-1 mol % $Yb_2O_3$-zirconia). In some embodiments, the SSZ-based ceramic composition may contain substantially no ceria (e.g., an unavoidable trace amount of ceria or less than 0.1 mol % ceria) if the composition contains at least 0.75 mol % ytterbia, such as 1 mol % ytterbia. Thus, the SSZ-based ceramic in embodiment cathodes may have the formula:

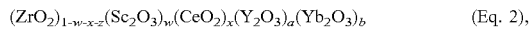
$$(ZrO_2)_{1-w-x-z}(Sc_2O_3)_w(CeO_2)_x(Y_2O_3)_a(Yb_2O_3)_b$$ (Eq. 2), where 0.09≤w≤0.11, 0<x≤0.0125, a+b=z, and 0.0025≤z≤0.011, and x+z≤0.02. Preferably, x ranges from 0.0025-0.0125, such as 0.004-0.011, z ranges from 0.0025-0.0125, such as 0.004-0.011, and the total of x and z is greater than or equal to 0.005 and less than or equal to 0.021, such as greater than or equal to 0.01 and less than or equal to 0.02. More preferably, w=0.1, x=0.01, and z=0.01 for an SSZ-based ceramic, according to embodiments based on Equation 2. In other embodiments based on Equation 2, the SSZ-based ceramic and electrolyte may have the same composition, with 0.009≤x≤0.011 and 0.009≤z≤0.011.

Example cathode SSZ-based ceramic compositions, according to the various embodiments based on Equation 2, include:

10Sc1Ce1Y (10 mol % $Sc_2O_3$+1 mol % $CeO_2$+1 mol % $Y_2O_3$), remainder zirconia;
10Sc1Ce0.5Y (10 mol % $Sc_2O_3$+1 mol % $CeO_2$+0.5 mol % $Y_2O_3$), remainder zirconia;
10Sc1Ce1Yb (10 mol % $Sc_2O_3$+1 mol % $CeO_2$+1 mol % $Yb_2O_3$), remainder zirconia;
10Sc1Ce0.5Yb (10 mol % $Sc_2O_3$+1 mol % $CeO_2$+0.5 mol % $Yb_2O_3$), remainder zirconia;
10Sc0.5Ce0.5Y (10 mol % $Sc_2O_3$+0.5 mol % $CeO_2$+0.5 mol % $Y_2O_3$), remainder zirconia;
10Sc0.5Ce0.5Yb (10 mol % $Sc_2O_3$+0.5 mol % $CeO_2$+0.5 mol % $Yb_2O_3$), remainder zirconia;
10Sc0.5Ce1Y (10 mol % $Sc_2O_3$+0.5 mol % $CeO_2$+1 mol % $Y_2O_3$), remainder zirconia;
10Sc0.5Ce1Yb (10 mol % $Sc_2O_3$+0.5 mol % $CeO_2$+1 mol % $Yb_2O_3$), remainder zirconia; and
10Sc1Yb (10 mol % $Sc_2O_3$+1 mol % $Yb_2O_3$), remainder zirconia.

In various embodiments, the amount of scandia may be greater than the amount of ceria and the amount of the at least one of yttria and ytterbia. The amount of ceria may be equal to, less than or greater than the amount of the at least one of yttria and ytterbia.

Embodiment cathodes may be 10-90 wt % ionically conductive ceramic material and 10-90 wt % electrically conductive ceramic material, such as 25-75 wt %, and preferably 30-70 wt % of each. In some embodiments, the cathode may also contain one or more additional catalyst material (e.g., cobalt, platinum, ruthenium, etc.) and/or sintering aid (e.g., cobalt, magnesium, nickel, iron, copper, etc.) In various embodiments, the additional one or more catalyst material and/or sintering aid may be around 0.5-5 wt % of the cathode.

The various SOFC embodiments may be utilized as the cathode layer of a planar SOFC, as illustrated in FIG. 1. In some embodiments, SOFC 100 may contain an electrolyte layer 10 that supports a cathode electrode 20 and an anode electrode 30. The cathode electrode 20 may be composed of the composite materials that include the formulas as described above. For example, the cathode electrode 20 may contain around 10-90 wt % of an ionically conductive phase, and around 10-90 wt % of an electrically conductive phase. For example, the cathode electrode 20 may contain around 55-75 wt %, preferably 70 wt %, of an ionically conductive ceramic (e.g., SDC or ScCeSZ), and around 25-45 wt %, preferably 30 wt %, of an electrically conductive ceramic (e.g., LSM).

In an alternative embodiment, the cathode electrode 20 has a graded composition where the amount of ionically conductive material decreases form the electrolyte-cathode interface towards the free surface of the cathode electrode, and/or the amount of the electrically conductive ceramic material increases from the electrolyte-cathode towards the free surface of the cathode electrode. This can be achieved in a continuous manner or in a plurality of layers varying in the ratio of the ionically conductive to the electrically conductive ceramics. Preferably, the ratio of the ionically conductive component to the electrically conductive component in the cathode electrode decreases form the electrolyte-cathode interface towards the free surface of the cathode electrode).

The electrolyte 10 may be composed of an ionically conductive phase that includes zirconia stabilized with scandia and at least one of ceria, yttria and ytterbia. In some embodiments, the electrolyte 10 material may be at least 80 wt % zirconia. In some embodiments, the composition of the electrolyte 10 may match (e.g., be the same as) that of the ionically conductive component (i.e., SSZ-containing ceramic) of certain embodiment cathodes cathode 20 in some embodiments. Compositions and configurations of the electrolyte layer may comprise those discussed in U.S. Pat. No. 8,580,456, which is hereby incorporated by reference in its entirety herein.

A method of forming the planar, electrolyte supported SOFC 100 shown in FIG. 1, includes forming the cathode electrode 20 on a first side of a planar solid oxide electrolyte 10 and forming the anode electrode 30 on a second side of the planar solid oxide electrode. The anode and the cathode may be formed in any order on the opposite sides of the electrolyte, and may be fired separately or together.

As shown in FIG. 1, the anode electrode 30 may contain one layer or a plurality of sublayers. Thus, the anode electrode 30 may optionally contain a first portion 40 and a second portion 50, each varying in composition and nickel content. For example, the first portion 40 may be located between an electrolyte 10 and the second portion 50, and may contain lower porosity compared to the second portion 50 of the anode electrode 30. The second portion 50 of the anode electrode may contain a higher ratio of the nickel containing phase to the ceramic phase than the first portion 40 of the anode electrode. Compositions, orientations and configurations of the cathode 20 and anode 30 electrodes may comprise those discussed in U.S. Pat. No. 8,748,056, which is hereby incorporated by reference in its entirety.

In some embodiments, the anode 30 may be a composite anode composed of a solid oxide ionically conductive phase (e.g., SDC, GDC or YDC), and an electrically conductive phase, such as a metal (e.g., nickel, copper, cobalt, platinum, palladium, etc. or their alloys).

An embodiment method of operating a SOFC, for example, the fuel cell 100 of FIG. 1, may include operating the fuel cell 100 at 800-850° C. for at least 4,000 hours in air and hydrogen-containing ambient provided on the cathode and anode side of the electrolyte, respectively. The fuel may be a hydrocarbon fuel which is reformed to hydrogen-containing fuel at the anode or upstream at an external reformer. Preferably, cathode materials of fuel cell 100 do not form resistive phases (i.e., zirconates) during the increase from room temperature to around 800-850° C., and therefore the voltage degradation of the SOFC is minimized (e.g., less than 15%). Also, cathode materials may have a high starting ionic conductivity of 0.14 S/cm or greater, preferably 0.15 S/cm or greater (e.g., 0.16-0.17 S/cm), and preferably maintain stable conductivity after operating at 800-850° C. for at least 4,000 hours. That is, in an air and/or hydrogen-containing environment, after 4,000 hours and at a temperature of 800-850° C., degradation in ionic conductivity of embodiment cathode materials be less than around 15%, such as 0-15%, for example 0-10%, including 1-5%.

The SOFC 100 is preferably an electrolyte supported cell in which the electrolyte is at least one order of magnitude thicker than the electrodes. For example, the electrolyte 10 may be about 150-300 microns thick, and the cathode electrode 20 and anode electrode 30 may each be about 10-50 microns thick, such as 20-40 micros thick. In various embodiments, the electrolyte 10 may be a planar electrolyte. The cathode 20 may be formed on one side of the planar solid oxide electrolyte 10, and the anode 30 formed on another (e.g., opposite) side of the planar solid oxide electrolyte 10. The anode and the cathode may be formed in any order on the opposite sides of the electrolyte.

Fuel cell stacks are frequently built from a plurality of SOFCs 100 in the form of planar elements, tubes, or other geometries. The stack may comprise a plurality of planar or plate shaped fuel cells. The fuel cells may have other configurations, such as tubular. The stacks may be vertically oriented stacks or the fuel cells may be stacked horizontally or in any other suitable direction between vertical and horizontal. A plurality of interconnects are located in the stack, such that each fuel cell is located between two interconnects, and each interconnect acts as a gas separator plate, as described in U.S. application Ser. Nos. 11/907,204 and 11/785,034, each of which is incorporated by reference in its entirety herein.

Figure 2:
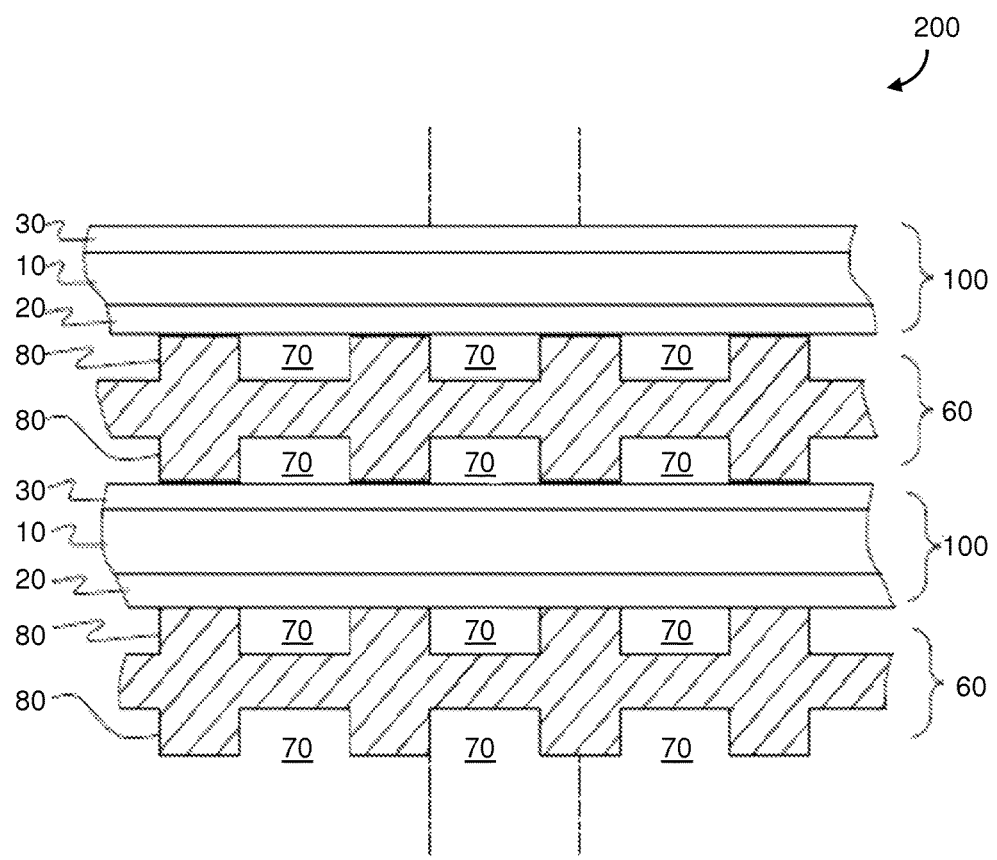
FIG. 2 is a side cross sectional view of a SOFC stack according to an embodiment.

FIG. 2 shows an example fuel cell stack 200, one component of which may be a so called gas flow separator (referred to as a gas flow separator plate in a planar stack) 60 that separates the individual cells in the stack. The gas flow separator plate separates fuel, such as a hydrocarbon and/or hydrogen fuel, flowing to the fuel electrode (i.e. anode 30) of one cell in the stack from oxidant, such as air, flowing to the air electrode (i.e. cathode 20) of an adjacent cell in the stack. The separator 60 contains gas flow passages or channels 70 between the ribs 80. Frequently, the gas flow separator plate 60 is also used as an interconnect which electrically connects the fuel electrode 30 of one cell to the air electrode 20 of the adjacent cell. In this case, the gas flow separator plate which functions as an interconnect is made of or contains electrically conductive material. An electrically conductive contact layer, such as a nickel contact layer, may be provided between the anode electrode and the interconnect. In stack 200, the lower SOFC 100 is located between two gas separator plates 60.

Furthermore, while FIG. 2 shows that the stack 200 comprises a plurality of planar or plate shaped fuel cells, the fuel cells may have other configurations, such as tubular. Still further, while vertically oriented stacks are shown in FIG. 2, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity, such as a column. In this case, the electrical power output from both stacks cannot be separately controlled.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A solid oxide fuel cell (SOFC), comprising:
a solid oxide electrolyte comprising a zirconia-based ceramic;
an anode electrode; and
a cathode electrode comprising an electrically conductive component and an ionically conductive component, wherein the ionically conductive component comprises a zirconia-based ceramic containing scandia, 0.25-1.25 mol % ceria, and 0.25-1.25 mol % ytterbia, yttria, or a combination of ytterbia and yttria.

2. The SOFC of claim 1, wherein the cathode electrode contains 10-90 wt % of each of the ionically conductive component and 10-90 wt % of the electrically conductive component.

3. The SOFC of claim 1, wherein the solid oxide electrolyte comprises scandia stabilized zirconia.

4. The SOFC of claim 1, wherein the solid oxide electrolyte comprises a formula $(ZrO_2)_{1-w-x-z}(Sc_2O_3)_w(CeO_2)_x(Y_2O_3)_a(Yb_2O_3)_b$, wherein $0.09 \leq w \leq 0.11$, $0 < x \leq 0.0125$, $a+b=z$, and $0.0025 \leq z \leq 0.0125$.

5. The SOFC of claim 4, wherein $0.009 < x \leq 0.011$, $0.009 \leq z \leq 0.011$, and wherein the ionically conductive component and the solid oxide electrolyte have the same composition.

6. The SOFC of claim 1, wherein the electrically conductive component comprises an electrically conductive ceramic selected from the group consisting of lanthanum strontium manganite (LSM), lanthanum calcium manganite (LCM), lanthanum strontium cobalt ferrite (LSCF), lanthanum strontium ferrite (LSF), lanthanum strontium manganese ferrite (LSMF) and lanthanum strontium chromite (LSCr), and lanthanum strontium cobaltite (LSCo).

7. The SOFC of claim 1, wherein the cathode electrode further comprises 0.5 wt % or less of at least one of an additional catalyst material comprising one or more of cobalt, platinum, or ruthenium, and a sintering aid comprising one or more of cobalt, magnesium, nickel, iron, or copper.

8. The SOFC of claim 1, the cathode electrode has a graded composition where a ratio of the ionically conductive component to electrically conductive component in the cathode electrode decreases from an electrolyte-cathode interface towards a free surface of the cathode electrode.

9. A method of operating a solid oxide fuel cell comprising a zirconia-based electrolyte and a cathode electrode containing an electrically conductive component and an ionically conductive component, the method comprising:
operating the solid oxide fuel cell at 800-850° C. for at least 4000 hrs such that the SOFC does not experience a voltage degradation of greater than 15%,
wherein the ionically conductive component comprises a zirconia-based ceramic containing scandia, 0.25-1.25 mol % ceria, and 0.25-1.25 mol % ytterbia, yttria, or a combination of ytterbia and yttria.

10. The method of claim 9, wherein the electrically conductive component comprises a perovskite ceramic.

* * * * *